United States Patent [19]
Gisko

[11] Patent Number: 5,662,415
[45] Date of Patent: Sep. 2, 1997

[54] CONVEYOR FOR DEGASSING OF MIXTURES FOR SOLID SURFACE PRODUCTS AND METHOD OF USE

[75] Inventor: Jerry A. Gisko, Darien, Ill.

[73] Assignee: Gisco Technology, Willowbrook, Ill.

[21] Appl. No.: 588,978

[22] Filed: Jan. 19, 1996

[51] Int. Cl.⁶ .................................. B01F 13/06; B01F 7/08
[52] U.S. Cl. .................... 366/139; 366/75; 366/163.1; 366/323; 425/203
[58] Field of Search ................... 366/64, 66, 75, 366/79, 88, 89, 91, 163.1, 96–99, 139, 186, 194–196, 318, 323, 153.1; 425/203, 205, 208, 209; 422/135

[56] References Cited

U.S. PATENT DOCUMENTS

| | | | |
|---|---|---|---|
| 2,041,619 | 5/1936 | Steele | 366/75 |
| 2,078,565 | 4/1937 | Durst et al. | 366/75 |
| 2,572,063 | 10/1951 | Skipper | 366/139 X |
| 3,361,537 | 1/1968 | Ferrante | 366/323 X |
| 3,493,031 | 2/1970 | Williams, Jr. et al. | 425/203 X |
| 3,633,494 | 1/1972 | Schippers et al. | 425/203 X |
| 3,781,132 | 12/1973 | Latinen | 366/75 X |
| 3,797,550 | 3/1974 | Latinen | 366/323 X |
| 3,801,286 | 4/1974 | Anolick et al. | 422/135 |
| 4,134,736 | 1/1979 | Hammond, Jr. | 422/135 X |
| 4,383,764 | 5/1983 | Sloin | 366/75 |
| 5,024,531 | 6/1991 | Will . | |
| 5,127,450 | 7/1992 | Saatkamp | 366/153.1 X |
| 5,186,840 | 2/1993 | Christy et al. | 366/153.1 X |
| 5,332,423 | 7/1994 | Gisko et al. . | |

FOREIGN PATENT DOCUMENTS 197550  10/1986  European Pat. Off. ............ 425/203

*Primary Examiner*—Charles E. Cooley
*Attorney, Agent, or Firm*—Brinks Hofer Gilson & Lione

[57] ABSTRACT

An improved conveyer apparatus for processing and degassing a mixture of materials for forming solid surface end products, such as cultured marble and other polymer casting products. The conveyer includes a conveyer housing with an internal passageway having a conically shaped upstream section and a downstream section. A rotatable screw is located in the internal passageway and has a shape that corresponds to the shape of the internal passageway, so that an upstream section of the screw is conically shaped. The upstream section of the passageway has an inlet that connects to a source of materials, such as a mixer, and the downstream section has an outlet that permits the mixture of materials to exit the conveyer apparatus. A vacuum source is connected to the conveyer housing to remove gases from the mixture as it is being conveyed through the conveyer.

30 Claims, 4 Drawing Sheets

5,662,415

CONVEYOR FOR DEGASSING OF MIXTURES FOR SOLID SURFACE PRODUCTS AND METHOD OF USE

BACKGROUND OF THE INVENTION

The present invention relates to a method and apparatus for processing and degassing mixtures or matrices of material for the production of solid surface material end products, and more particularly, the present invention relates to a conveyer apparatus that provides for the continuous degassing of a mixture or matrix of materials in the production of solid surface products, such as cultured marble and other polymer casting products.

In the production of certain solid surface material end products, such as polymer casting products, the various materials from which the solid surface end product is formed are initially mixed together under controlled conditions and then conveyed as a liquid-solids mixture or matrix to a mold or other type of reservoir where the mixture of materials solidifies. The initial mixing process typically causes air or other gases to become suspended in the liquid-solids mixture. After the mixing process but before the mixture is poured into the mold, various additives, catalysts, hardeners, etc., may be added to the mixture. Certain types of solid surface end products require that the air or other gases be removed from the mixture before it hardens, or before the catalyst or other additives are added.

Various arrangements have been devised to degas such fluid liquid-solids mixtures. One type of arrangement requires that a batch of the mixture be poured into an intermediate reservoir that is maintained under a vacuum. Another type of degassing arrangement is shown in U.S. Pat. No. 5,024,531. Although such arrangements may accomplish the desired degassing, there still exists a need for an improved degassing system for processing a liquid-solids mixture. Further, it would be desirable if the degassing process operated on a continuous basis and was efficient and reliable.

SUMMARY OF THE INVENTION

To achieve the foregoing and other objectives and in accordance with the purposes of the present invention, there is provided an improved method and means for processing and degassing a mixture of materials for forming a solid surface end product, such as a polymer casting product. A conveyer includes a conveyer housing with an internal passageway having a conically shaped upstream section and a downstream section. A rotatable screw is located in the internal passageway and has a shape that corresponds to the shape of the internal passageway, so that an upstream section of the screw is conically shaped. The upstream section of the passageway has an inlet that connects to a source of materials, such as a mixer, and the downstream section has an outlet that permits the mixture of materials to exit the conveyer housing. A vacuum source is connected to the conveyer housing to remove gases from the mixture as it is being conveyed through the conveyer.

DETAILED DESCRIPTION OF THE PREFERRED EMBODIMENTS

Figure 1:
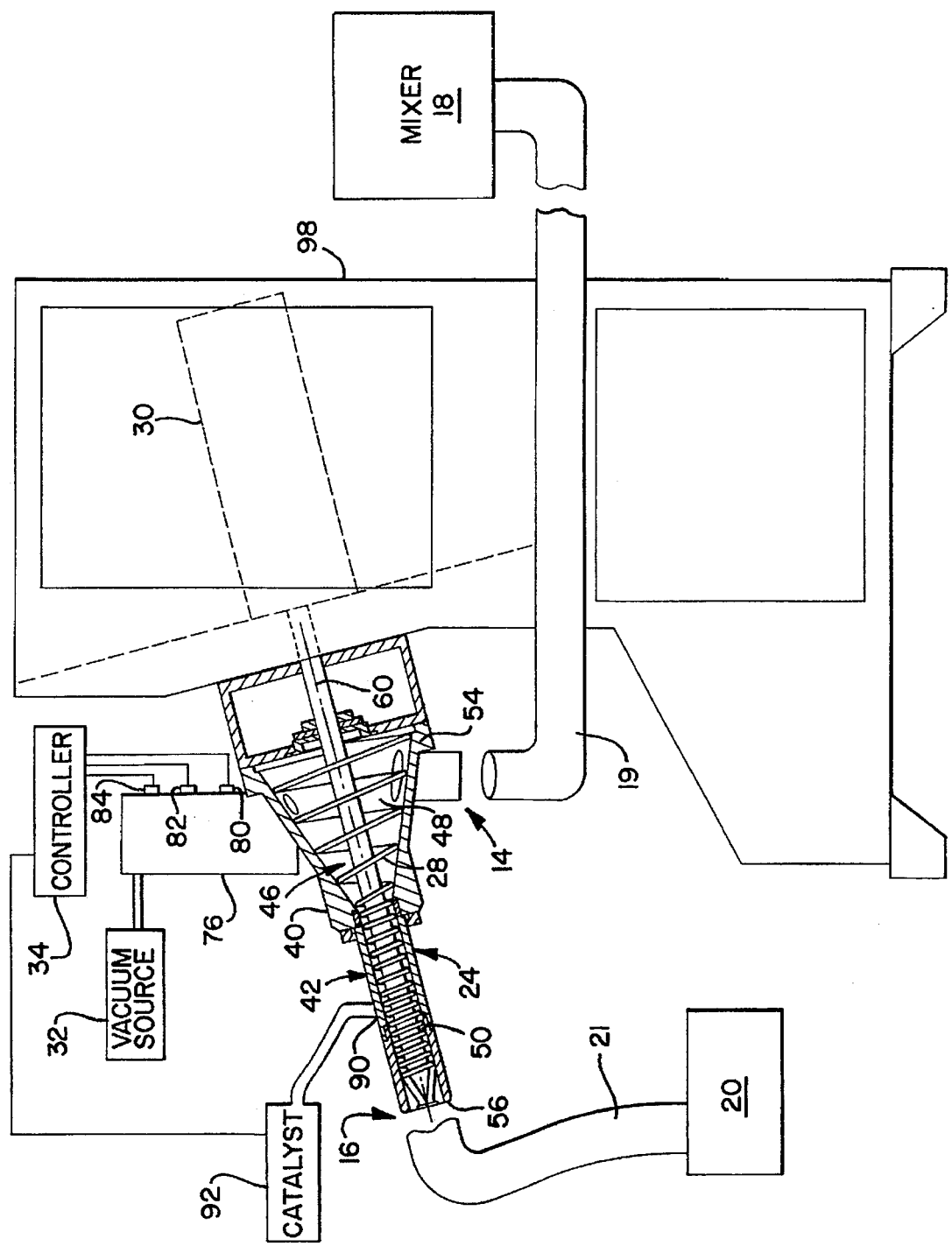
FIG. 1 is a side view, partially in section, of a first embodiment of the present invention.

Referring to FIG. 1, there is shown a first embodiment of the present invention. A conveyer 10 includes an inlet 14 and an outlet 16. The inlet 14 connects to a mixer 18. The mixer 18 may be a conventional type of mixer into which various solids and liquids, such as fillers, aggregates, powders, polymers, elasticizers, binder agents, coloring, water, plastics, etc., are mixed under controlled conditions. The controlled conditions may include control of mixing times, heat, pressure, sequence and quantity of addition of materials, and intensity of mixing. When the material in the mixer 18 has been sufficiently mixed, or is otherwise ready, it is output to the conveyer 10 via a pipe, tube, or hose 19.

The outlet 16 of the conveyer 10 connects to a mold 20, or alternatively to a reservoir or to other process. The mold, reservoir or other process may also be conventional. The outlet 16 may be connected to the mold by any suitable means, such as a pipe or tubing 21.

The conveyer 10 includes a conveyer housing 24, a screw 28, a motor 30, a vacuum source 32 and a controller 34. The conveyer housing 24 includes at least two parts or sections: a first or upstream section 40 and a second or downstream section 42. The conveyer housing 24 defines an internal passageway 46 that extends through the housing 24 from the upstream section 40 through the downstream section 42. The internal passageway 46 includes at least two sections 48 and 50 that correspond to the upstream and downstream sections of the housing 24.

The inlet 14 of the conveyer 10 connects to the upstream section 40 and communicates with the upstream section passageway 48. As shown more specifically in FIGS. 2 and 3, the inlet 14 connects to a lower side of the upstream section 40 of the housing 24 close to an upstream end 54 thereof. Referring again to FIG. 1, the outlet 16 of the conveyer 10 connects to the downstream section 42 of the housing and communicates with the downstream passageway 50, and more specifically, the outlet 16 connects to a downstream end 56 of the downstream section 42. The internal passageway 46 has a generally circular cross section along its length, although the cross section is larger in the upstream section 48, as explained further below.

Figure 2:
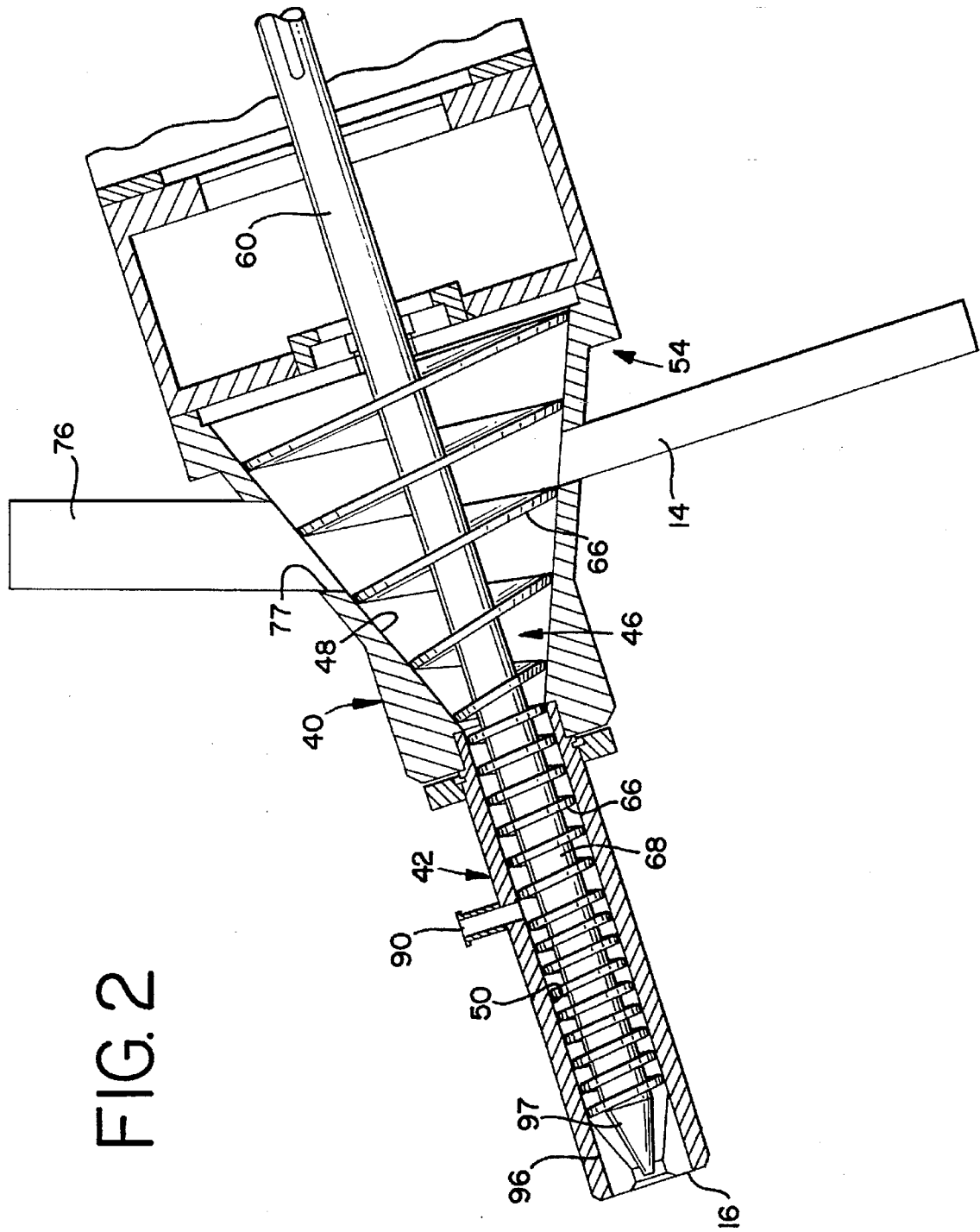
FIG. 2 is a close-up side sectional view of a portion of the conveyer housing and screw of FIG. 1.
Figure 3:
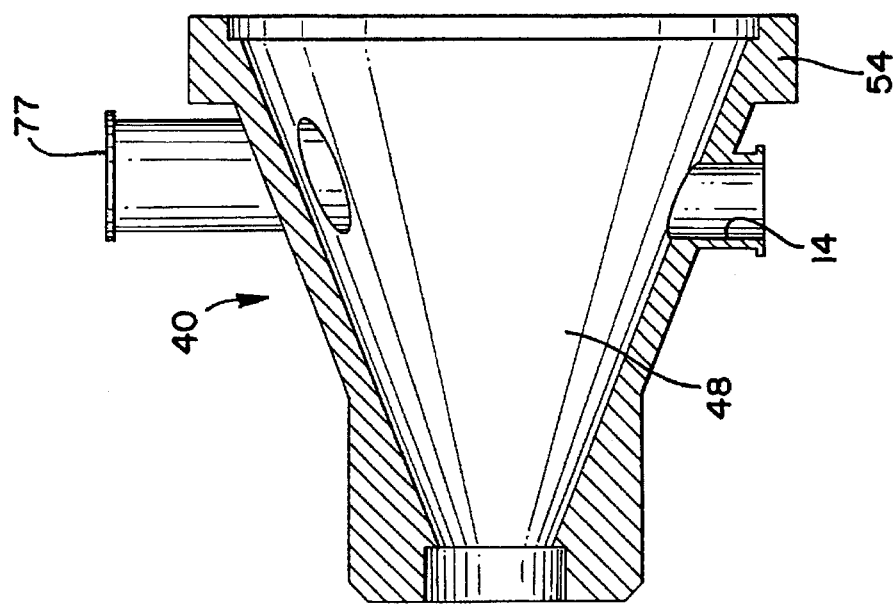
FIG. 3 is a side sectional view of the upstream portion of the conveyer housing of FIGS. 1 and 2.
Figure 5:
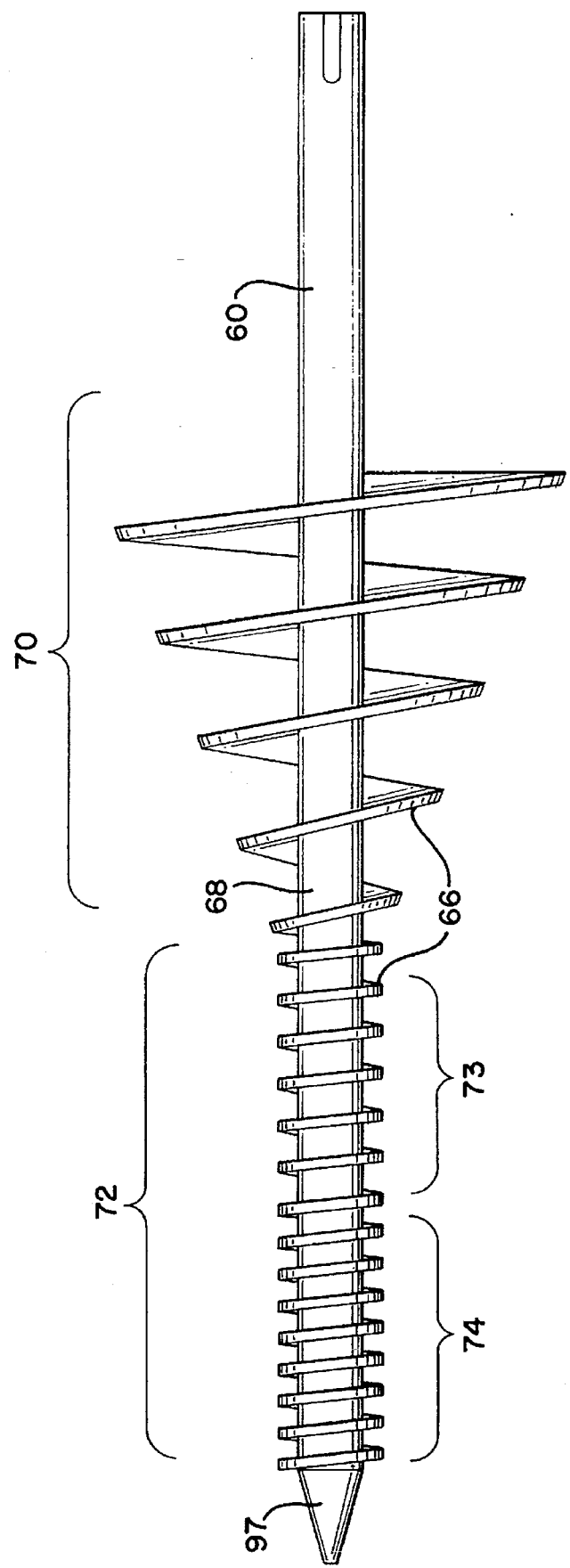
FIG. 5 is a side view of the screw of FIGS. 1 and 2.

Referring to FIGS. 1, 2, and 5, the screw 28 is located in the conveyer housing 24 and specifically the screw 28 is located in the passageway 46 and extends from the upstream end 54 to the downstream end 56. The screw 28 is rotatable inside the conveyer housing 24. The screw 28 includes a proximal shaft 60 that extends through an opening in the upstream end 54 of the housing. The proximal shaft 60 connects to the motor 30 so that the motor 30 can impart rotation to the screw 28 via the proximal shaft 60.

The screw 28 includes threads 66 that helically wind around a shaft portion 68 of the screw 28. The outer diameter of the threads 66 define an outer profile of the screw along its length. The outer diameter of the threads is close in dimension to the inner diameter of the passageway 46 so that rotation of the screw 28 will cause material in the passageway 46 to move downstream. Referring to FIG. 5, the screw 28 includes at least two sections: an upstream section 70 and a downstream section 72. The upstream and downstream sections 70 and 72 of the screw 28 correspond to the upstream and downstream sections of the housing and passageway. The pitch of the threads in the downstream section 72 of the screw is tighter than the pitch of the threads in the upstream section 70 of the screw. In a preferred embodiment, the downstream section 72 of the screw includes at least two subsections. A first downstream subsection 73 is directly adjacent to the upstream section 70 and a second downstream subsection 74 is adjacent to the first downstream subsection 73, but on the side opposite from the upstream section 70. The threads in the second downstream subsection 74 have a tighter pitch than the threads in the first downstream subsection 73.

In a present embodiment, the housing 24 and screw 28 have a geometry that provides for efficient degassing of a mixture that is being conveyed in the passageway 46 of the conveyer 10. As shown in the figures, the upstream section 70 of the screw 28 and the upstream section 48 of the passageway 46 have matching conical or tapered profiles. The tapering is in a downstream direction so that the downstream part of the upstream section is smaller in diameter than the upstream part. The downstream section 72 of the screw and the downstream section 50 of the passageway have even cylindrical profiles.

Figure 4:
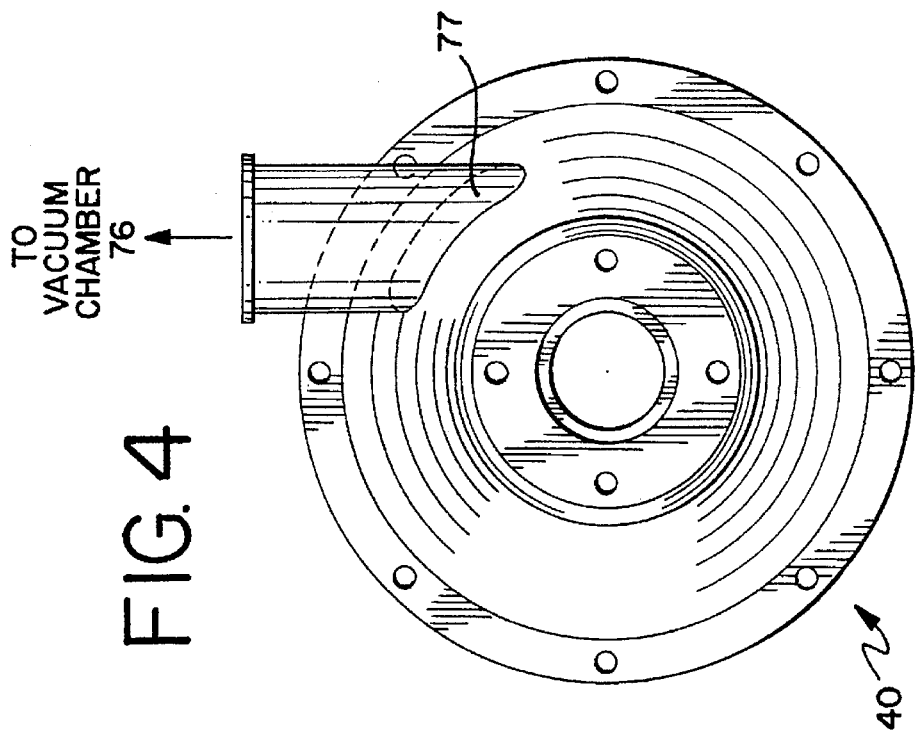
FIG. 4 is an end view of the portion of the conveyer housing of FIG. 3.

Referring to FIGS. 1–4, a vacuum chamber 76 connects to an opening 77 located in upper side of the proximal housing 40. The interior of the vacuum chamber 76 communicates with the upper side of the upstream passageway 48. As shown in FIG. 4, in a preferred embodiment the opening 77 to the vacuum chamber 76 does not connect to the uppermost part of the upstream housing 40, but is offset therefrom for reasons to explained below. The vacuum chamber 76 connects to the vacuum source 32, as shown in FIG. 1.

Associated with the vacuum chamber 76 is at least one and preferably three sensors, 80, 82 and 84. The sensors are located vertically along a side of the vacuum chamber 76. Each of the sensors is adapted to output a signal indicative of whether a mixture is in the vacuum chamber 76 at a level adjacent to the sensor. Various sensing technologies may be used, and in a preferred embodiment, capacitive sensors are used. Each of the capacitive sensors measures the capacitance directly adjacent to it in the vacuum chamber. If the mixture rises to the level of the sensor, the measured capacitance changes and the sensor provides an output.

The outputs of the sensors 80, 82, and 84 are connected to the controller 34. The controller 34 provides a controlling output signal to the motor 30. The controller 34 can modify the speed of the motor. In addition, the controller 34 can provide for various other operations and tasks associated with the production of solid surface matrices, including the provision of the controlled conditions associated with the mixer 18, mentioned above. Controllers of this type are conventional and well known in the art.

Referring to FIGS. 1 and 2, the housing 24 includes a second inlet 90 located in the downstream section 42. The second inlet 90 connects to a catalyst source 92. The catalyst source 92 may also be connected to the controller 34. Under operation of the controller 34, the catalyst source 92 may inject catalysts or other additives into the downstream section 50 of the passageway 46.

Referring to FIG. 2, at the downstream end 56 of the housing 24, the ID of the internal passageway 46 necks down to form a restriction 96. The distal end 97 of the shaft 68 of the screw is tapered to conform to the shape of the restriction 96.

The conveyer 10 may also include a base 98. The base 98 may be used for mounting the housing 24 and other parts of the conveyer 10, such as the motor 30, the controller 34, or related parts of the mixture processing equipment. In a present embodiment, the conveyer housing 24 is mounted to the base 98 on an angle so that it slopes from the upstream end to the downstream end. In a present embodiment, the slope is approximately 10°.

In a present embodiment, the housing 24 and screw 28 are made of steel. The upstream section of the screw 70 is approximately 11.2 inches in length, the first downstream subsection 73 of the screw is approximately 6.25 inches in length, and the second downstream subsection 74 of the screw is approximately 6.25 inches in length. The shaft 66 of the screw 28 has a diameter of approximately 35 mm. The OD of the screw in the downstream section 72 is approximately 2.5 inches. The OD of the screw in the upstream section 70 tapers from approximately 11.5 inches to 2.5 inches. In a present embodiment, the taper forms an angle of approximately 44.5°. The threads 66 are approximately 0.25 inches in thickness. In the upstream section 70 the threads are spaced 2.50 inches apart, in the first downstream subsection 73 the threads are spaced 1 inch apart, and in the second downstream subsection 74 the threads are spaced 0.75 inches apart. The internal passageway 46 has a length that is suitable for containing the screw 28. The ID of the internal passageway 46 of the housing 24 conforms to the OD of the screw 28 plus a suitable tolerance, for example 0.25 inches. The restriction 96 at the distal end of the housing has an ID of approximately 1 inch and a length of approximately 2.25 inches.

The controller 34 may be an PLC manufactured by Sumitomo Inc. The motor 30 may be manufactured by Eurodrive Systems. The sensors may be manufactured by Omron Inc. The vacuum source may be a vacuum pump manufactured by Gerb. Becker.

In operation, the conveyer 10 is assembled and connected to receive the output from the mixer 18. The conveyer 10 is primed in a conventional manner.

In a preferred embodiment, the material from the mixer 18 may be pumped toward the conveyer 10 through the pipe 19, or may be gravity-fed, or alternatively, may not be pumped at all. In a preferred embodiment, the pipe 19 has a length that is sufficient so that the mixture from the mixer 18 will not flow into the inlet 14 of the conveyer 10 absent application of the vacuum from the vacuum source 32. In this manner, control of the vacuum 32 contributes to the control of the level of mixture in the vacuum chamber 76. In a present embodiment, the length of the pipe 19 is approximately 6 feet, although other lengths may be suitable depending on the size of the pipe, the speed of the motor 30, the pumping force, if any, applied by the mixer 18, and so on.

The outlet 16 of the conveyor 10 is connected to the reservoir 20. The vacuum source 32 is operated to apply a vacuum to the chamber 76. In a present embodiment, a vacuum of approximately 8 inches of Hg is applied to the chamber 76. The motor 30 is operated at a suitable speed, which in a preferred embodiment is approximately 415 RPM. This speed can be varied, under the operation of the controller. Under direction of the controller, suitable catalysts may be added to the second inlet 90.

The degassing of the mixture occurs in the upstream section 40 of the housing. As the screw 28 rotates, the mixture is rotated past the bottom of the vacuum chamber 76. Exposure to the vacuum draws air and other gases out of the mixture. Degassing is efficiently performed in the conveyer because the relatively large diameter of the upstream section of the housing exposes a substantial portion of the material to the vacuum as it passes through the upstream section of the conveyor housing. The opening 77 from the housing to the vacuum chamber is located so that it offset from the uppermost part of the housing so that rotation of the screw will not cause material to flow upward into the chamber. Accordingly, the opening is located past top-dead-center of the housing depending on the direction of rotation of the screw.

As mentioned above; the screw 28 has different pitches in the upstream section 70, the first downstream section 73 and the second downstream section 74. Specifically, the pitch becomes successively tighter in the downstream direction in each of these sections. This has the effect of restricting the flow of material at the downstream end causing it to back up in a limited and controlled manner toward the upstream section 46 of the passageway. This contributes to improved, and in part material, and in particular contributes to the exposure of the mixture to the vacuum in the upstream section 40 of the housing, thereby contributing to the degassing of the material.

As the material is being conveyed and degassed in the conveyer 10, the level of the material in the vacuum chamber 76 can be used to control the flow rate. If the rotation of the screw is too slow, the vacuum source 32 will begin to draw material up into the vacuum chamber 76. The sensors 80, 82 and 84, located adjacent to the chamber 76 will detect the rising level of the material. The outputs for the sensors are staged so that the controller can slow down or stop the motor 30 if the material rises too high in the chamber 76. As mentioned above, the vacuum is also Used to draw the material into the housing 24. This enables the conveyer 10 to be self-feeding and provides for an efficient and controllable operation of the system. The degassing can proceed on a continuous basis as the material is being conveyed through the conveyer to the mold 20.

It is intended that the foregoing detailed description be regarded as illustrative rather than limiting and that it is understood that the following claims including all equivalents are intended to define the scope of the invention.

I claim:

1. An improved conveyer apparatus for processing a mixture of materials comprising:
    a conveyer housing comprising:
        an upstream section and a downstream section, wherein said upstream section has a conically shaped wall that defines a conically shaped interior passageway that is larger at an upstream end thereof;
    a rotatable screw located in said conveyer housing, said screw having a first section located in said upstream section of said conveyer housing and a second section located in said downstream section, wherein said first section of said screw has a conical shape corresponding to said conically shaped interior passageway;
    a first inlet to said conveyer housing for providing a mixture of materials into said conveyer housing, said first inlet connected to said upstream section;
    an outlet from said conveyer housing, said outlet connected to a downstream end of said downstream section; and
    a vacuum source connected to said conically shaped wall of said conveyer housing to remove gases from the mixture.

2. The improved conveyer apparatus of claim 1 further comprising:
    a second inlet to said conveyer housing, said inlet connected to a source of catalysts.

3. The improved conveyer apparatus of claim 2 wherein said second inlet to said conveyer housing is connected to said downstream section of said conveyer housing.

4. The improved conveyer apparatus of claim 1 wherein said vacuum source comprises
    a vacuum chamber connected to said conically shaped wall of said conveyer housing and further wherein said vacuum source is connected to said vacuum chamber.

5. The improved conveyer apparatus of claim 4 wherein said vacuum chamber extends upward from said conically shaped wall of said conveyer housing.

6. The improved conveyer apparatus of claim 1 further comprising:
    at least one sensor connected to said conveyer housing, said at least one sensor responsive to a presence of material in said housing.

7. The improved conveyer apparatus of claim 6 further comprising a controller, and wherein said at least one sensor provides an output to said controller.

8. The improved conveyer apparatus of claim 6 wherein said at least one sensor is located in a chamber extending upward from said conically shaped wall of said conveyer housing.

9. The improved conveyer apparatus of claim 8 wherein said vacuum source connects to said chamber.

10. The improved conveyer apparatus of claim 6 wherein said at least one sensor is a capacitive sensor.

11. The improved conveyer apparatus of claim 1 wherein said downstream section of said conveyer housing includes a downstream interior passageway having a cylindrical geometry.

12. The improved conveyer apparatus of claim 11 wherein said second section of said screw includes a profile having a cylindrical geometry.

13. The improved conveyer apparatus of claim 1 wherein said screw includes at least two portions having a different pitch.

14. The improved conveyer apparatus of claim 1 wherein said second section of said screw includes a first portion and a section portion and wherein said first portion has a tighter pitch than said second portion.

15. The improved conveyer apparatus of claim 14 wherein said first portion is downstream of said second portion.

16. The improved conveyer apparatus of claim 1 wherein said second section of said screw has a tighter pitch than said first section.

17. The improved conveyer apparatus of claim 1 wherein said vacuum source provides for drawing said mixture of materials into said conveyer housing.

18. The improved conveyer apparatus of claim 1 wherein said first inlet is located on a lower side of said upstream section.

19. The improved conveyer apparatus of claim 1 wherein said upstream section of said conveyer housing is directly adjacent to said downstream section.

20. The apparatus of claim 1 wherein said conveyor housing maintains said screw in a close to horizontal position sloping from an upstream end to a downstream end.

21. The apparatus of claim 1 wherein said conveyor housing maintains said screw in a position sloping from an upstream end to a downstream end at an angle of approximately 10°.

22. An apparatus for continuously conveying and degassing a mixture of materials comprising:
    a conveyer apparatus comprising:
        a housing having an elongate passageway, said passageway having an upstream section that tapers from a first diameter to a second diameter, and a downstream section having a substantially even diameter; and a screw located in said passageway and rotatable therein, said screw adapted to convey said minute of materials from said upstream section through said downstream section, wherein said screw has a shape corresponding to said passageway; and a degassing apparatus connected to said housing between a portion thereof at said first diameter and a portion thereof at said second diameter to remove gases from the mixture.

23. The apparatus of claim 22 wherein said conveyor housing maintains said screw in a close to horizontal position sloping from an upstream end to a downstream end.

24. The apparatus of claim 22 wherein said conveyor housing maintains said screw in a position sloping from an upstream end to a downstream end at an angle of approximately 10°.

25. A method for continuously conveying and degassing a mixture of material with a conveyer apparatus comprising the steps of:

providing a conveyer apparatus having a housing defining an elongate passageway wherein said passageway has an upstream section that tapers from a first diameter to a second diameter and a downstream section having a substantially even diameter; and a screw located in said passageway and having a shape corresponding thereto, and a degassing apparatus connected to said housing between a portion thereof at said first diameter and a portion thereof at said second diameter to remove gases from the mixture;

rotating said screw in said passageway of said housing in a direction to convey material from said upstream section to said downstream section; and applying a vacuum from said degassing apparatus to said upstream section to withdraw gases from said mixture.

26. The method of claim 25 further comprising:

sensing a level of mixture in said upstream section of said passageway.

27. The method of claim 25 wherein said step of applying a vacuum additionally draws said material into said upstream section.

28. The method of claim 25 further comprising the step of:

adding a catalyst to said mixture while said mixture is in said passageway.

29. The method of claim 25 further comprising the step of:

controlling a speed of said rotating.

30. The method of claim 25 further comprising the step of:

sensing a level of mixture in said housing and controlling a speed of said rotating based on said sensing.

* * * * *

UNITED STATES PATENT AND TRADEMARK OFFICE
CERTIFICATE OF CORRECTION

PATENT NO. : 5,662,415
DATED : September 2, 1997
INVENTOR(S) : Jerry A. Gisco

It is certified that error appears in the above-identified patent and that said Letters Patent is hereby corrected as shown below:

On the Title Page

In column 2, item [57], please change "conveyer" (all occurrences) to --conveyor--.

Please change "conveyer" to --conveyor-- throughout the entire document.

Please change "conveyer" to --conveyor--, all occurrences in all the claims.

Claim 22, line 10, please change "minute" to --mixture--.

Signed and Sealed this

Thirtieth Day of May, 2000

Attest:

Q. TODD DICKINSON

*Attesting Officer*     *Director of Patents and Trademarks*